No. 611,475. Patented Sept. 27, 1898.
J. GREENWOOD.
LUBRICATOR.
(Application filed Mar. 24, 1898.)
(No Model.) 2 Sheets—Sheet 2.
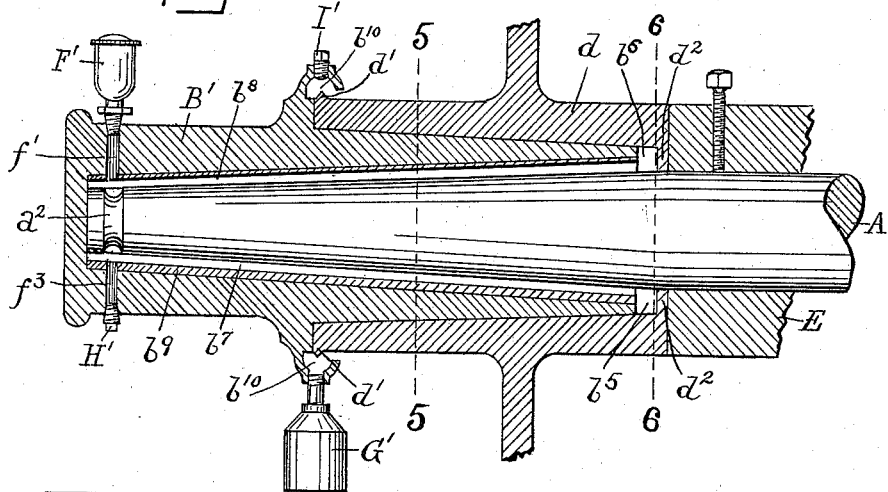
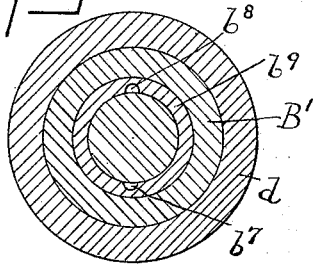
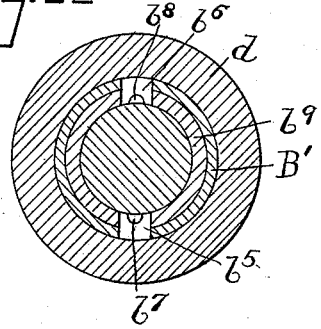
Witnesses.
A. R. Selden
C. R. Osgood
Inventor:
John Greenwood
by
Osgood & Davis
Attorneys.

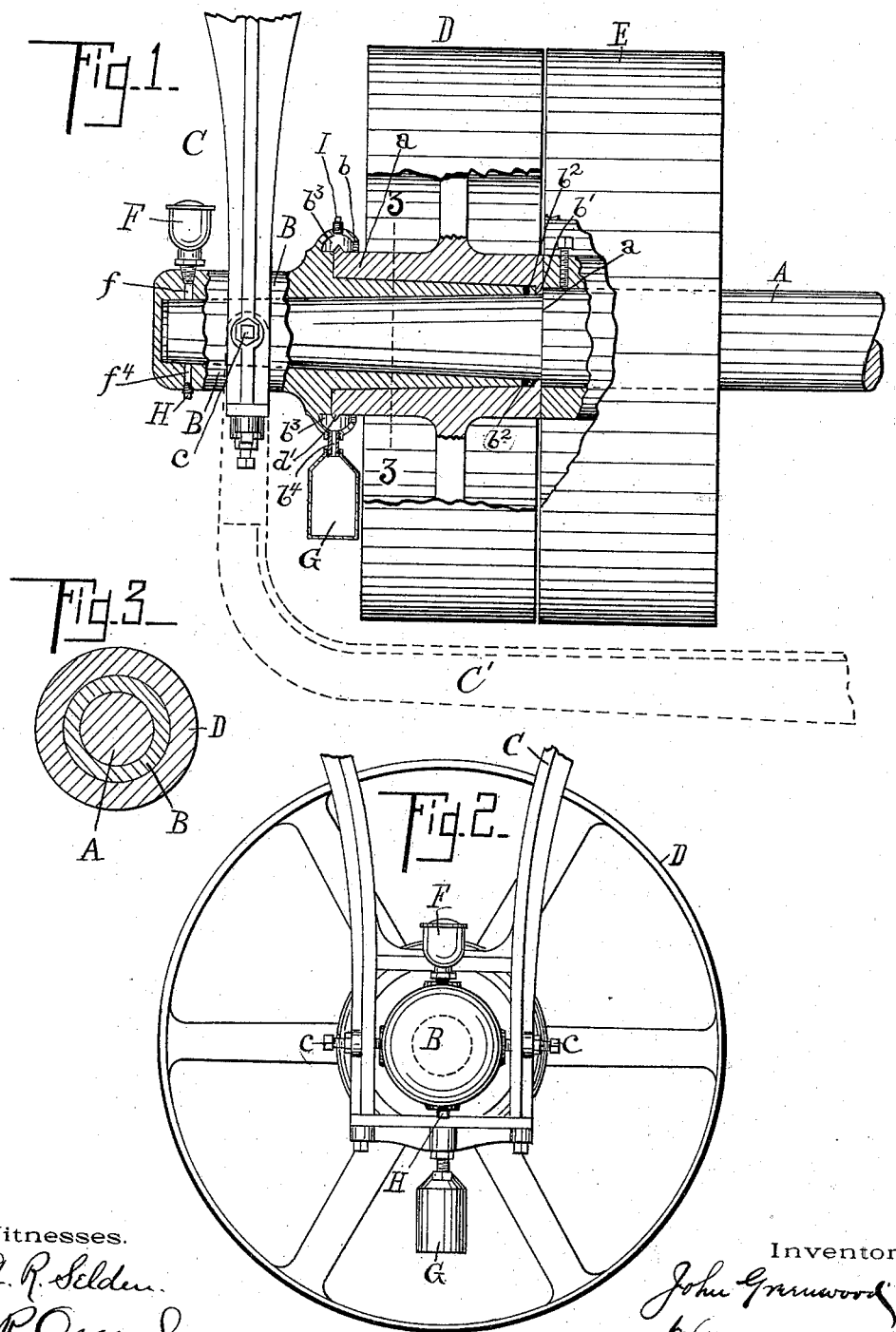

UNITED STATES PATENT OFFICE.

JOHN GREENWOOD, OF ROCHESTER, NEW YORK.

LUBRICATOR.

SPECIFICATION forming part of Letters Patent No. 611,475, dated September 27, 1898.

Application filed March 24, 1898. Serial No. 674,984. (No model.)

*To all whom it may concern:*

Be it known that I, JOHN GREENWOOD, a citizen of the United States, and a resident of Rochester, in the county of Monroe and State of New York, have invented certain new and useful Improvements in Lubricators, of which the following is a specification.

My invention relates to the lubrication of bearings, and has for its object to provide means for lubricating loose pulleys. Its novel features will be fully set forth and explained in the following description.

In the annexed drawings, Figure 1 is an elevation of a loose and a tight pulley, together with portions of their shaft and hanger, a portion being shown in cross-section. Fig. 2 is an end view of my device. Fig. 3 is a cross-section on the line 3 3 of Fig. 1. Fig. 4 is a longitudinal section of parts of the loose and tight pulleys, showing a modified form of my invention; and Figs. 5 and 6 are cross-sections on the lines 5 5 and 6 6, respectively, of Fig. 4.

A represents the shaft, which tapers from the shoulder $a$ to its extremity. The tapering end of the shaft is journaled within the non-rotatable box B, and the whole device is supported by the hanger C, the box B being secured to the hanger by adjusting-screws $c$. A bracket C' may be used in place of the said hanger to support the shaft in the manner shown by the dotted lines in Fig. 1.

A shoulder $b$ is formed upon the outside of the box B, adjacent to the hanger C, and from the shoulder to its extremity the exterior surface of said box is tapered in an opposite direction from that of its internal taper, thus making an external reverse taper. Upon the tapering exterior surface of the box B the loose pulley D is revolubly set, its hub $d$ having a tapering bore to fit the said external taper of the box and being extended so as to lie against the flat face of the shoulder $b$ on the said box. At the other end of the hub of the loose pulley an inwardly-projecting flange $b'$, Fig. 1, lies between the end of the box B and the shoulder $a$ of the shaft A or the end of the hub of the tight pulley. The loose pulley is thus retained between the shoulder $b$ and the shoulder $a$ or the end of the hub of the tight pulley and is thus secured against excessive lateral play. Adjacent to the loose pulley D and inside the shoulder $a$ the tight pulley E is fastened to the shaft by any suitable means.

I provide one or more orifices for connecting the interior surface of the box with the exterior surface thereof, at or near the inner end thereof, where the two tapering surfaces are nearest together. This orifice or these orifices are therefore close to the inner end of the hub of the loose pulley. Such an orifice or perforation $b^2$ is shown in Fig. 1 in the box near its inner end.

The oil is fed from the supply-cup F and passes through the perforation $f$ to the shaft A, the flow of the oil from the cup being regulated by any of the well-known devices employed for that purpose. As the axis of the shaft is horizontal, that end of the box B through which is the perforation $b^2$ is lower than the other end, which is beneath the supply-cup, and therefore the oil tends to flow through the box to the said perforation $b^2$, within which it accumulates. The revolution of the shaft carries the oil by the action of centrifugal force through the box to the perforation $b^2$. Passing through said perforation to the hub $d$ of the loose pulley the oil works back through said hub when the loose pulley is set in motion, since the exterior surface of the box B is tapered in the opposite direction to that in which the shaft is tapered. As it leaves the hub it is caught within the chamber $b^3$ in the box B above the shoulder $b$. An outwardly-turned flange $d'$ upon the end of the hub discharges the oil through the pipe $b^4$, from which it passes into the drip-cup G.

In that form of my device shown in Figs. 1 and 3, which I have just described, the oil does not pass freely through the box B to the perforation $b^2$ when the shaft is idle, and when, therefore, the oil which has accumulated within the perforation $b^2$ has been exhausted by the running of the loose pulley the supply of oil may fail it.

In order to provide a supply of oil which enables the loose pulley to be run continuously for a longer period, I make an orifice for connecting the interior of the box with the exterior thereof, consisting of a recess $b^5$ in the end of the box B' below the shaft, as shown in Fig. 4, and also form a longitudinal channel $b^7$ in the babbitt lining $b^9$ of the box B′, leading to the said recess from the other end of the shaft. The orifice $b^5$ need be only in the lower side of the box; but two such orifices are shown in Figs. 4 and 6, one in the upper and the other in the lower side of the box, in order that the box may be reversed, so as to provide against wear. Through this channel the oil flows to the said recess in such quantity as to furnish a constant supply for the loose pulley. The oil also flows through the channel $b^7$ when the shaft is idle, and the loose pulley is thereby lubricated. An inwardly-turned flange $d^2$ upon the end of the hub $d$ of the loose pulley prevents the oil from escaping from the recess $b^5$ between the two pulleys. The chamber $b^{10}$, into which the oil is discharged from the flange $d'$, (shown in Fig. 4,) is somewhat open above the hub $d$. I provide also, as shown in Fig. 4, a groove $a^2$ around the end of the shaft beneath the perforations $f'$, which permits the freer flow of oil to the longitudinal channel $b^7$ beneath it.

It will be observed that the perforations $f$ and $f'$, perforation $b^2$, recess $b^5$, and channel $b^7$ are duplicated in perforations $f^3$ and $f^4$, perforations $b^2$, recess $b^6$, and channel $b^8$, respectively, each being diametrically opposite its corresponding part, so that the boxes B and B′ may be turned half around upon the shaft, in order to prevent their wearing and bring into use said duplicate parts. When this is done, the plugs H, I, H′, and I′ change places with the cups F, G, F′, and G′, respectively.

I have shown the box closed about the end of the shaft A. If the shaft is slow running, the oil is apt to drip from its end unless it is so inclosed; but if the shaft is run at high speed the oil is carried rapidly to the other end of the box B and little, if any, of it escapes from the end of the shaft.

The foregoing construction shows the preferred form of my lubricating device for general use. It is obvious that the shaft need not be tapered, but that the flow of oil will still occur, as above described, without the taperings specified above. The untapered form of the device is intended for use with high-speed shafts.

What I claim is—

1. The combination of a shaft; a non-rotatable box formed internally to fit the shaft and having an external tapered bearing-surface; a loose pulley having a hub tapered internally and fitting the external bearing-surface of the box; said box having an orifice connecting the interior of the box with the exterior thereof and located at or near the smaller end of the tapered box; and an oil-supply to the outer end of the shaft.

2. The combination of a shaft having a tapering end; a non-rotatable box tapering internally to fit the shaft, and having an external reverse taper; a loose pulley fitting the external taper of the box; said box having an orifice connecting the interior of said box with the exterior thereof, located at or near a point where the interior and exterior surfaces are nearest together; and an oil-supply to the end of the shaft.

3. The combination of a shaft having a tapering end; a non-rotatable box tapering internally to fit the shaft, and having an external reverse taper; a loose pulley fitting the external taper of the box; said box having an orifice connecting the interior of said box with the exterior thereof, located at or near what is the lowest part of the interior of said box when the said shaft is horizontal; said box having also a longitudinal channel in the interior surface of the box leading from said orifice to the end of the shaft; and an oil-supply to the end of the shaft.

4. The combination of a shaft having a tapering end; a non-rotatable box tapering internally to fit the shaft, and having an external reverse taper; a loose pulley fitting the external taper of the box; said box having an orifice connecting the interior of said box with the exterior thereof, located at or near a point where the interior and exterior surfaces are nearest; an oil-supply to the end of the shaft; and a drip-cup at the outer end of the reverse external taper of said box.

5. The combination of a shaft having a tapering end; a non-rotatable box tapering internally to fit the shaft and having an external reverse taper; a loose pulley fitting the external taper of the box; said box having an orifice connecting the interior of said box with the exterior thereof, located at or near a point where the interior and exterior surfaces are nearest together; an oil-supply to the end of the shaft; a chamber around the said box above the outer end of the reverse external taper of said box; and a drip-cup beneath said chamber.

6. The combination of the shaft A having a tapering end; the non-rotatable box B′ tapering internally to fit the shaft and having an external reverse taper; the loose pulley D, fitting the external taper of the box; said box having the orifice $b^5$ connecting the interior of said box with the exterior thereof, located at or near the point where the interior and exterior surfaces are nearest together; said box having also the longitudinal channel $b^7$ in the interior surface of the box leading from said orifice to the end of the said shaft; and an oil-supply to the end of the shaft.

JOHN GREENWOOD.

Witnesses:
  F. BISSELL,
  SADIE CORYELL.